United States Patent [19]

Pope

[11] Patent Number: 5,186,892
[45] Date of Patent: Feb. 16, 1993

[54] METHOD OF HEALING CRACKS AND FLAWS IN A PREVIOUSLY SINTERED CEMENTED CARBIDE TOOLS

[75] Inventor: Louis M. Pope, Provo, Utah

[73] Assignee: U.S. Synthetic Corporation, Provo, Utah

[21] Appl. No.: 643,137

[22] Filed: Jan. 17, 1991

[51] Int. Cl.$^5$ .............................................. B22F 3/24
[52] U.S. Cl. ........................................ 419/53; 419/55
[58] Field of Search ...................... 419/54, 58, 53, 55

[56] References Cited

U.S. PATENT DOCUMENTS 3,595,484  7/1971  Barnard et al. ...................... 75/0.5

OTHER PUBLICATIONS

Goetzel, "Treatise on Powder Metallurgy", vol. 1, 1949, pp. 673–675.

Primary Examiner—Donald P. Walsh
Assistant Examiner—Daniel Jenkins
Attorney, Agent, or Firm—Thorpe, North & Western

[57] ABSTRACT

This patent covers the concept of putting a previously sintered carbide tool or part back through the sintering process. This resintering, heals stress related microcracks which, when allowed to progress, could ultimately be a cause of the failure for the object. This produces a longer life, better quality cemented carbide tool to be used for cyclically applying pressure and/or heat.

8 Claims, No Drawings

METHOD OF HEALING CRACKS AND FLAWS IN A PREVIOUSLY SINTERED CEMENTED CARBIDE TOOLS

BACKGROUND OF THE INVENTION

1. Field of the Invention

In the industrialized world, production equipment is becoming more and more complicated and expensive. Customers have become, increasingly, more demanding of high quality cemented carbide necessary for competitive production. The life of a piece of equipment mostly depends upon the durability of a few vital components exposed to wear, fatigue or corrosion. This is an important reason for concentrating on the improvement of these few expensive components.

Cemented carbide has greater wear resistance and strength than tool steels. This is why there are many tungsten carbide applications in industry today. In spite of the five to ten times additional cost, the performance justifies the additional expense. Still these carbides can be very expensive to replace. This invention relates to the process of resintering cemented carbide products to make them more durable and to prolong their life. Specifically, it is related to sintered carbide products that are loaded and unloaded cyclically and ultimately crack in a type of fatigue failure.

2. Prior Art

The process of sintering carbide has been known in the industry for over 30 years. Sintering consists of bonding powdered carbide with a binder metal from the iron group (iron, nickel, or cobalt) under high temperatures (around 1400 degrees Centigrade), in a controlled atmosphere, and with a controlled heat cycle. This forms a product with extremely high hardness and compressive strength. The strength and hardness can be varied with different amounts and types of binder metal, additives and sizes of the powdered carbide grains. Small amounts of Tantalum and Titanium are sometimes added to change the properties of the final product. After sintering, the cemented carbide tooling has a rough, and slightly irregular, surface which needs be ground to finished dimensions.

Cemented carbide has, among other things, high strength at elevated temperatures and is very resistant to wear. This makes sintered carbide valuable in cutting tool applications, metal forming tooling, and in the high pressure, high temperature industry.

It has been a major objective of the high pressure, high temperature industry to increase the life of their cemented carbide tooling. In that industry, cemented carbide tooling represents a significant expense of operation. The problem is that the tooling fails under the necessary operating conditions after a limited number of cycles. The carbide fails due to internal cracks which begin with the first cycle and are propagated exponentially with each successive cycle. Complete failure occurs when these cracks, reach the surface of the carbide and the tooling can no longer withstand the operational loads. Upon fracture, the carbide tool is no longer of use and must be replaced. The scrap value is a small portion of the original cost.

Cemented carbide users have tried to prolong the life of their tooling by various post sintering processes with mixed results. One of these processes is grinding or lapping the surface of the part, after some use, to remove some surface defects and adverse chemistry. Others have tried heat treating cemented carbide parts short of resintering temperatures with some success. But historically, the resintering of cemented carbide has been unexplored and considered an unlikely area for improving product. The conventional wisdom was that nothing could be done to heal internal cracks once they had started.

It is, therefore, the object of this invention to provide a method of improving the life of such cemented carbide parts through a resintering process and thereby reducing the cost of operating with cemented carbide.

SUMMARY OF THE INVENTION

The present invention provides a method for significantly reducing the aforesaid problem by treating the carbide part or tool utilizing a resintering process to minimize residual stresses and eliminated micro-cracking. The useful life of the sintered carbide object can be significantly improved by resintering.

Description of the Process

Sometime after the time that the cemented carbide tooling is ground and before the time that the it fails, the part is resintered using any sintering process commonly used in the industry to sinter tungsten carbide. The part is put through a process not limited to but including the following:

The carbide object is placed in a standard sintering furnace. A vacuum or hydrogen atmosphere is used to control the environment. Then, according to the type of furnace used, the operational sequence of outgasing, heat up, soak, and cool down is determined. The object is then brought to the sintering temperature of about 1350 C. or higher depending on the composition. The resintering temperature and heat cycle is the same as the original sintering temperatures and heating cycles.

In the original sintering process, the carbide grade and composition is determined and components are mixed. Typically, the components are milled for several days in a ball mill or several hours in an attriter. The mix is then weight out and prepressed into the desired shape. In this green unfired state the carbide has little strength and low density.

These green parts are then placed in a sintering furnace and are brought up, slowly, to the desired temperature. When the sintering temperature is reached, the carbide is partially dissolved into the cobalt. The cobalt melts and the part shrinks. When fully cooled the carbide becomes solid, the resulting material is very hard and sometimes ready for application in its sintered state. More often, the parts are finished by grinding or lapping.

The resintering process takes an already dense, and hard piece of carbide and puts it back into the sintering furnace to go through, essentially, the same cycle again. But, instead of getting shrinkage and a more density, as in the first sintering operation, the part remains very nearly the same in physical properties. The same phase changes occur as in the original sinter, that is, cobalt dissolves some carbide and the cobalt goes liquid. But with repeat sintering, the internal stresses are relieved and the internal micro cracks are healed. Larger grains of carbide, that occur on the surface of some parts, migrate and tend to mix uniformly through out the part. If sintered properly, the part actually comes out of the furnace with many improved properties making the part, in many respects, better than the original.

It should be noted that internally the part is clean from contaminants because cracks have not reached the surface and, therefore, have not been exposed to outside air and other contaminants. Any cracks which have come to the surface will not mend in the same way by this process and will produce inferior parts if resintered.

Description of Usefulness

Sintering carbide products is not a new process. The practice of resintering is a new idea that can make carbide objects used for cyclical loading last longer. Experimental results show that the effective life of cemented carbide tooling used in the diamond synthesis industry can be more than doubled. Even though failure of carbide objects is a costly, time consuming problem, no one has successfully applied the idea of resintering the cemented carbide tooling to lengthen life. Generally, cemented carbide tooling is used until failure occurs, then the part cannot be further used. Upon failure the tooling must be removed and scrapped. In the high pressure high temperature industry the cost of the cemented carbide is a very significant portion of the overall costs. The application of this patent can have a dramatic economic impact on many cemented carbide users.

Carbide parts can be sometimes unpredictable in their fatigue patterns. When one part goes catastrophically, it will sometimes cause the failure of parts near by. If, by practice, these parts were taken out, periodically, and sent through a resintering process, they could be healed of many precarious but not fatal, fatigue cracks. The life of that part would then be lengthened. The loss of other parts by proximity failure could be controlled by not allowing a neighbor part to approach the failure stage as frequently. By this, down time would be reduced and the possibility of major damage being done to the whole apparatus also diminished.

Specific Examples of Application

High pressure presses, using tungsten carbide tooling, apply the ultra-high pressures needed for synthesizing diamond products. This tooling fails regularly. Each tungsten carbide anvil, belt or punch costs thousands of dollars and requires a lengthy and costly labor process to replace.

If this invention is applied, the tooling is removed before complete failure and is replaced by new or resintered tooling. The removed tooling is then put through the resintering process. It has been shown that this tooling will be useful for several thousand more cycles and that it is possible to repeat the process of resintering over and over again.

A group of forty six tungsten carbide anvils, used on a cubic 2000 ton press, were monitored until failure. All of the anvils had at least 1000 cycles. Nineteen were resintered one to three times. Twenty seven were allowed to run until failure with no resinter. After the failure of both groups of anvils, the total cycles of each anvil was recorded.

The results were surprising. The conventional wisdom of the sintering industry disclosed that: First, the anvils would not survive the resinter furnace and second, the original physical properties would be substantially diminished. Instead, the anvils not only survived the ovens but the properties actually improved. A single resinter more than doubled the average life of the anvils. Three resinters more than tripled the average life. Overall, the nineteen anvils that had been resintered at least once had an average cycle life of 4303 runs. Of the 27 single sintered anvils, the average cycle life was 1758 runs.

What is claimed is:

1. A method of healing internal microcracks and internal fatigue flaws in a previously sintered cemented carbide object comprising resintering said object for a predetermined period of time at about the same as the original sintering temperatures and heating cycles.

2. A method as in claim 1 wherein said object is made of materials selected from the group consisting of cemented tungsten carbide, cemented titanium carbide and cemented tantalum carbide.

3. A method as in claim 1 wherein said resintering is carried out for substantially the same period of time and at substantially the same temperature as the initial sintering of the object.

4. A method as in claim 3 wherein the initial sintering of the object is the process for sintering green tungsten carbide, and wherein said resintering comprises said process for sintering green tungsten carbide.

5. A method as in claim 1 further comprising repeating the resintering step at selected intervals, after use of the object.

6. A method of repairing internal cracks in a cemented carbide tool made using a predetermined sintering process, where such cracks have not yet reached the surface of the tool, comprising resintering the tool using substantially the same predetermined process.

7. A method as in claim 6 further comprising resintering said tool at selected intervals after use of the tool, using substantially the same predetermined process.

8. A method as in claim 6 wherein said tool is made of material selected from the group consisting of cemented tungsten carbide, cemented titanium carbide and cemented tantalum carbide.

* * * * *